United States Patent
Mitsuhara et al.

(10) Patent No.: US 8,244,433 B2
(45) Date of Patent: Aug. 14, 2012

(54) STEERING ANGLE DETECTION DEVICE AND METHOD THEREFOR

(75) Inventors: Takashi Mitsuhara, Uda (JP); Hideaki Takamura, Kashihara (JP); Fumihiro Kawakami, Okazaki (JP)

(73) Assignee: JTEKT Corporation, Osaka-Shi (JP)

( * ) Notice: Subject to any disclaimer, the term of this patent is extended or adjusted under 35 U.S.C. 154(b) by 451 days.

(21) Appl. No.: 12/458,854

(22) Filed: Jul. 24, 2009

(65) Prior Publication Data

US 2010/0030427 A1    Feb. 4, 2010

(30) Foreign Application Priority Data

Jul. 29, 2008    (JP) ................. 2008-195346

(51) Int. Cl.
| | |
|---|---|
| *A01B 69/00* | (2006.01) |
| *B62D 6/00* | (2006.01) |
| *B62D 11/00* | (2006.01) |
| *B62D 12/00* | (2006.01) |
| *B63G 8/20* | (2006.01) |
| *B63H 25/04* | (2006.01) |
| *G05D 1/00* | (2006.01) |
| *G06F 7/00* | (2006.01) |
| *G06F 17/00* | (2006.01) |
| *G06F 19/00* | (2011.01) |

(52) U.S. Cl. ......... 701/41; 180/6.28; 180/6.44; 180/412
(58) Field of Classification Search .................... 701/41; 180/6.2, 6.28, 6.44, 412, 443, 446
See application file for complete search history.

(56) References Cited

U.S. PATENT DOCUMENTS

| | | | | |
|---|---|---|---|---|
| 6,334,502 | B1 * | 1/2002 | Tsujimoto ................ | 180/446 |
| 2002/0014877 | A1 * | 2/2002 | Kaji et al. ................ | 318/783 |
| 2003/0079932 | A1 * | 5/2003 | Ono et al. ................ | 180/407 |
| 2004/0112148 | A1 * | 6/2004 | Sakai et al. .............. | 73/862.331 |
| 2004/0188172 | A1 * | 9/2004 | Asada ....................... | 180/446 |
| 2005/0205344 | A1 * | 9/2005 | Uryu ......................... | 180/446 |
| 2008/0040001 | A1 * | 2/2008 | Ogawa et al. ........... | 701/41 |
| 2008/0177444 | A1 * | 7/2008 | Tachibana et al. ...... | 701/41 |
| 2009/0276121 | A1 * | 11/2009 | Limpibunterng et al. | 701/41 |

FOREIGN PATENT DOCUMENTS

JP    A-2000-296781    10/2000

* cited by examiner

*Primary Examiner* — Khoi Tran
*Assistant Examiner* — Jamie Figueroa
(74) *Attorney, Agent, or Firm* — Oliff & Berridge, PLC

(57) ABSTRACT

A steering angle detection device includes: a shaft angle detector that detects a rotation angle of a shaft that transmits a rotation operation of a steering member to a steering mechanism; a motor angle detector that detects a rotation angle of a motor that applies a steering assist force to the steering mechanism; a steering angle calculation unit that calculates a steering angle on the basis of a combination of the rotation angle detected by the motor angle detector and the rotation angle detected by the shaft angle detector, and a temperature detector that detects an ambient temperature of the steering mechanism, wherein the steering angle calculation unit corrects the rotation angle detected by the motor angle detector or the shaft angle detector on the basis of the ambient temperature detected by the temperature detector and uses the corrected rotation angle to calculate the steering angle.

5 Claims, 2 Drawing Sheets

STEERING ANGLE DETECTION DEVICE AND METHOD THEREFOR

INCORPORATION BY REFERENCE

The disclosure of Japanese Patent Application No. 2008-195346 filed on Jul. 29, 2008 including the specification, drawings and abstract is incorporated herein by reference in its entirety.

BACKGROUND OF THE INVENTION

1. Field of the Invention

The invention relates to a steering angle detection device configured to enable the detection of a steering angle of a vehicle over the entire range in which steering is possible, and a method therefor.

2. Description of the Related Art

Steering of a vehicle is typically implemented by transmitting a rotation operation of a steering member such as a steering wheel to a steering mechanism via a steering shaft and changing the orientation of the left and right front steerable wheels by the action of the steering mechanism. The steering angle of the vehicle or orientation of steerable wheels obtained as a result of such steering is information that is necessary for a variety of control operations in the vehicle, such as increase-decrease control of a steering assist force in a power steering apparatus and distribution control of a braking force in an antilock brake system, and steering angle detection devices for detecting the steering angle are installed on many vehicles.

The steering angle of a vehicle can be found by detecting the rotation angle of a shaft that transmits a rotation operation of a steering member, such as the steering shaft, and successively integrating the detection value. Further, in a steering apparatus configured as an electric power steering apparatus, the steering angle can be also found by detecting a rotation angle of a motor for steering assist and successively integrating the detection value. The effect obtained in this case is that no special sensor is required because the detection value of the motor rotation angle is used that is necessary for driving the motor.

Further, a rotation angle detector that outputs a signal showing a plurality of periodic fluctuations in one turn of the object shaft, such as a resolver, is widely used as a shaft angle detector that detects the rotation angle of a steering shaft or a motor angle detector that detects the rotation angle of a motor. A steering shaft can make 4 to 5 turns in the entire steering angle range between the left and right steering limit positions, and a motor for steering assist makes the number of revolutions corresponding to a reduction ratio of a reducer provided for reduction transmission of power to the steering mechanism within the same entire steering angle range.

The detection values of the shaft angle detector and motor angle detector thus become the repetitions of multiple periodic fluctuations within the entire steering angle range, and in a steering angle detection device configured to find the steering angle by integrating these detection value, an absolute steering angle as a steering angle integrated value from the starting point is required. When the vehicle travels, a correct steering angle can be found, for example, by performing the integration by taking a straightforward travel state as a starting point with a zero absolute steering angle. However, the problem arising immediately after the vehicle starts traveling from a stopping state in which the power source was cut off by turning off the key switch is that the absolute steering angle serving as a reference is unclear and the steering angle cannot be determined before a straightforward travel state is assumed and a starting point can be established.

To resolve this problem, a steering angle detection device disclosed in Japanese Patent Application Publication No. 2000-296781 (JP-A-2000-296781) is provided with both the shaft angle detector and the motor angle detector mentioned hereinabove, and the absolute steering angle can be detected by combining the detection values of the two detectors.

This steering angle detection device uses the fact that the detection values of the shaft angle detector and motor angle detector are repetitions of multiple periodic fluctuations within the entire steering angle range, as mentioned hereinabove, and the detection of absolute steering angle is made possible by settings such that the fluctuation periods of the two detectors do not overlap and that identical detection value combinations are not generated in the entire steering angle range.

However, in the steering angle detection device disclosed in JP-A-2000-296781, under specific conditions, the initial steering angle determined by a combination of detection values of the shaft angle detector and motor angle detector sometimes does not correspond to the actual steering angle. As a result, in some cases, an error is generated in the steering angle detection value that uses the initial steering angle as a reference, and this erroneous steering angle detection value impairs the execution of control of various kinds.

SUMMARY OF THE INVENTION

The conditions under which an error occurs in the initial steering angle include large temperature variations around the steering mechanism equipped with the shaft angle detector and motor angle detector, and a large error occurs when the detection value of the shaft angle detector or motor angle detector is close to a peak value of respective fluctuation period.

This is because materials with different thermal expansion coefficients are used for constituent components of the steering mechanism, and when the temperature variations around the steering mechanism are large, the difference in elongation of the constituent components causes the steering shaft to rotate and the detection value of the shaft angle detector that detects the rotation angle of the steering shaft does not correspond to the detection value of the motor angle detector.

For example, a rack-and-pinion steering mechanism that is used in a large number of vehicles is provided with a pinion shaft that is coupled to an end portion of a steering shaft and a rack shaft that meshes with the pinion shaft, and the steering mechanism is so configured that the rotation of the steering shaft induced by rotation operation of a steering member is converted into the movement in the axial direction of the rack shaft that meshes with the pinion shaft, thereby performing steering.

In such a rack-and-pinion steering mechanism, the rack shaft and pinion shaft are supported inside a housing that is made from aluminum to reduce weight, and when the ambient temperature of the steering mechanism is high, the elongation of the rack shaft made from steel differs from that of the housing made from aluminum. As a result, the rack shaft performs relative movement in the longitudinal direction of the shaft inside the housing, a rotation force is applied by this movement to the pinion shaft, the steering shaft coupled to the pinion shaft is also rotated, and the rotation angle of the steering shaft changes.

The detection value of the shaft angle detector that detects the rotation angle of the steering shaft changes periodically as described hereinabove. Therefore, in a case where the variation in rotation angle caused by the effect of temperature is generated in a position close to the peak value of fluctuation period and the detection values of the shaft angle detector before and after the peak value differ from each other, the initial steering angle that can be determined, as described hereinabove, by a combination of the detection value of the shaft angle detector and the detection value of the motor angle detector differs significantly from the actual steering angle.

It is an object of the invention to provide a steering angle detection device in which the effect of ambient temperature on the steering angle calculated based on a combination of detection values of the shaft angle detector and motor angle detector can be eliminated and a correct steering angle can be found at all times, and to provide a method therefor.

A steering angle detection device according to one aspect of the invention includes: a shaft angle detector that detects a rotation angle of a shaft that transmits a rotation operation of a steering member to a steering mechanism; a motor angle detector that detects a rotation angle of a motor that applies a steering assist force to the steering mechanism; a steering angle calculation unit that calculates a steering angle on the basis of a combination of the rotation angle detected by the motor angle detector and the rotation angle detected by the shaft angle detector; and a temperature detector that detects an ambient temperature of the steering mechanism, wherein the steering angle calculation unit corrects the rotation angle detected by the motor angle detector or the shaft angle detector on the basis of the ambient temperature detected by the temperature detector and uses the corrected rotation angle to calculate the steering angle.

In the steering angle detection device according to another aspect of the invention, the rotation angle detected by shaft angle detector or detected by motor angle detector is corrected based on the ambient temperature of the steering mechanism and the corrected rotation angle is used to calculate the steering angle. Therefore, it is possible to find a correct steering angle from which the error caused by the effect of ambient temperature has been eliminated and the detection of steering angle can be performed without a delay when the vehicle starts traveling after being stopped.

In the steering angle detection device of the above-described aspect, the motor angle detector or the shaft angle detector may be a resolver that outputs a cosine wave signal and a sine wave signal that vary periodically in response to the rotation of the motor or the shaft, and the temperature detector may detect the ambient temperature on the basis of a sum of squares of amplitudes of the cosine wave signal and sine wave signal.

In the steering angle detection device of the above-described aspect, because the ambient temperature of the steering mechanism is detected using the output of the shaft angle detector or motor angle detector, a temperature sensor for temperature detection is not required and device configuration can be simplified.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
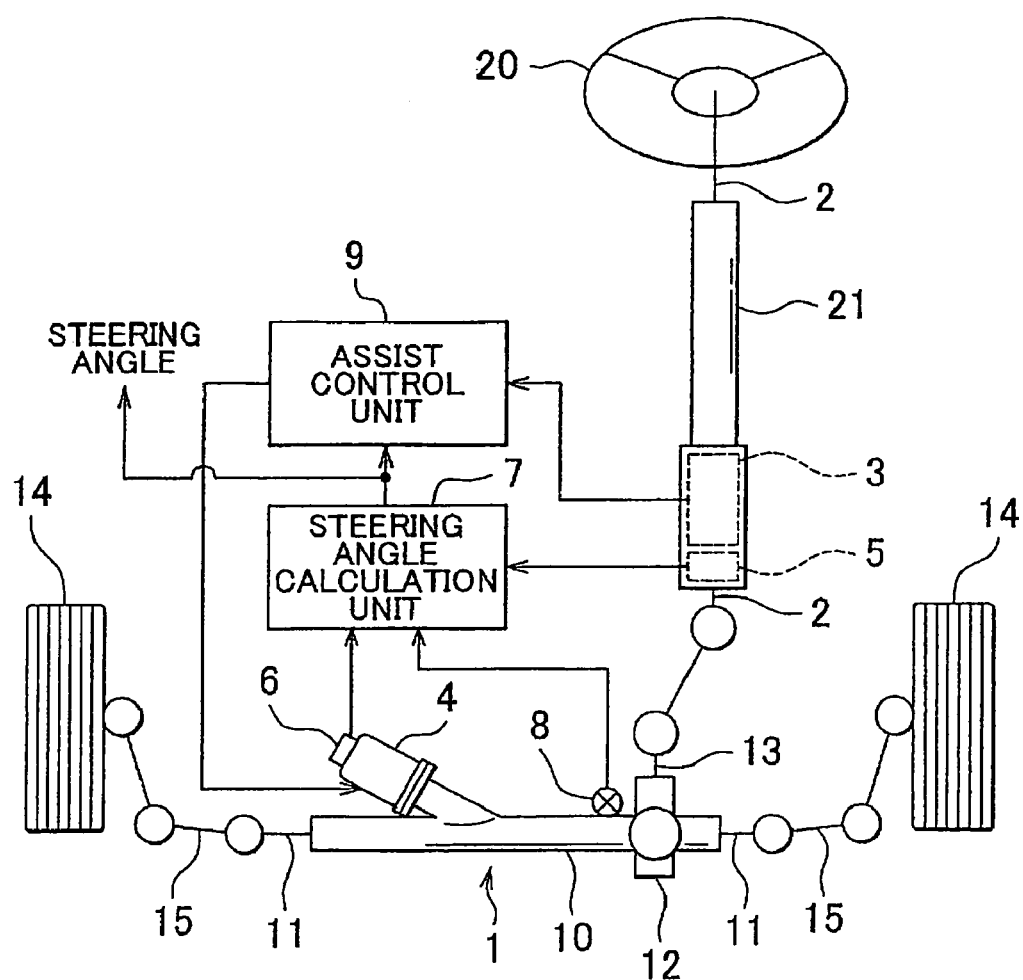
FIG. 1 is a schematic diagram illustrating the configuration of an electric power steering apparatus equipped with a steering angle detection device in accordance with the embodiment of the invention.

The invention will be explained below in greater details with reference to the appended drawings. FIG. 1 is a schematic diagram illustrating the configuration of an electric power steering apparatus equipped with a steering angle detection device in accordance with the embodiment of the invention. The electric power steering device shown in the figure is provided with a rack-and-pinion steering mechanism 1 that includes a rack shaft 11 that is axially movably supported inside a rack housing 10 that extends in the transverse direction of a vehicle and a pinion shaft 13 that is rotatably supported inside a pinion housing 12 that crosses the rack housing 10 in the intermediate portion thereof.

Both ends of the rack shaft 11 that protrude to the outside from both sides of the rack housing 10 are coupled via respective tie rods 15, 15 to left and right front wheels 14, 14 as steerable wheels. The upper end of the pinion shaft 13 that protrudes at the top of the pinion housing 12 is coupled to the lower end of a steering shaft 2 that is positioned above the pinion shaft and so as to face the upper end of the pinion shaft 13. A pinion (not shown in the figure) is formed at the lower portion of the pinion shaft 13 that extends inside the pinion housing 12. In the intersection portion with the rack housing 10, the pinion meshes with rack teeth formed along a predetermined distance at the outer surface of the rack shaft 11.

The steering shaft 2 is rotatably supported inside a column housing 21 having a cylindrical shape. The steering shaft 2 extends via the column housing 21 from a lower end of the column housing to the upper end thereof inside a vehicle cabin (not shown in the figure) in upward and rearward direction of the vehicle and is attached to the vehicle so as to maintain a tilted posture. Both ends of the steering shaft 2 protrude to the outside from the upper and lower sides of the column housing 21, the end protruding downward is coupled to the pinion shaft 13 as mentioned hereinabove, and the end protruding upward has fixedly mounted thereon a steering wheel 20 serving as a steering member.

With the above-described configuration, in a case where the steering wheel 20 is rotated to the left or to the right, this rotation is transmitted to the pinion shaft 13 via the steering shaft 2, and the rotation of the pinion shaft 13 is converted into the axial movement of the rack shaft 11 in the meshing section of the pinion and rack teeth. The movement of the rack shaft 11 that is thus induced is transmitted to the left and right front wheels 14, 14 via the tie rods 15, 15 located at both ends, and the front wheels 14, 14 are steered.

The electric power steering device shown in the figure is provided with a torque sensor 3 that detects a steering torque applied to the steering shaft 2 when the steering wheel 20 is rotated in the course of the above-described steering and a motor 4 for steering assist that is driven based on the torque detected by the torque sensor 3.

The steering shaft 2 includes two shafts including upper shaft and lower shaft, and these two shafts including upper shaft and lower shaft are coupled on the same axis via a torsion bar to form the steering shaft 2. The torque sensor 3 detects a relative angular displacement between the two shafts of the steering shaft 2 that occurs following the torsion of the torsion bar and finds a steering torque applied to the steering shaft 2. The torque sensor 3 is provided inside the lower portion of the column housing 21, as shown by a broken line in FIG. 1.

The motor 4 for steering assist is attached to the intermediate portion of the rack housing 10 so that the central axis of the motor is inclined with respect to the rack housing 10. The rotation of the output shaft of the motor 4 that extends inside the rack housing 10 is decelerated and motion converted, for example, by a ball screw mechanism and transmitted to the rack shaft 11, whereby an axial motion force is applied to the rack shaft 11. With such a configuration, the steering operation of the steering wheel performed by the driver is assisted by a rotation force of the motor 4 for steering assist.

The motor 4 for steering assist can be also configured to be mounted on the outside of the pinion housing 12 or column housing 21 and transmit the assist force to the pinion shaft 13 or steering shaft 2. The transmission from the motor 4 to the pinion shaft 13 or steering shaft 2 can be realized via a reducer that uses no motion conversion, such as a worm gear reducer equipped with a worm and a worm wheel, because the shafts 13 and 2 are both rotary shaft.

Further, with the object of detecting a steering angle of the left and right front wheels 14, 14 that are steered in the above-described manner, the electric power steering device shown in the figure is provided, in an intermediate portion of the column housing 21, with a shaft angle detector 5 that detects a rotation angle of the steering shaft 2 supported inside the column housing 21, and also provided with a motor angle detector 6 that detects a rotation angle of the motor 4 for steering assist.

The shaft angle detector 5 is a conventional rotation angle detector such as a resolver and is provided below the torque sensor 3 and in a row therewith inside the column housing 21 that supports the steering shaft 2. In a case of a configuration in which the torque sensor 3 detects a rotation angle separately for each of the two shafts coupled on the same axis via the torsion bar, as described hereinabove, and finds a relative angular displacement of the two shafts from the difference between the detected angles thereof, the detection unit of a rotation angle provided on one of the two shafts can be also used as the shaft angle detector 5. The shaft angle detector 5 may be provided on the shaft that is rotated by the operation of the steering wheel 20. For example, the shaft angle detector 5 may be provided so as to detect the rotation angle of the pinion shaft 13.

Similarly to the shaft angle detector 5, the motor angle detector 6 can be constituted by a conventional rotation angle detector such as a resolver. In a case where the motor 4 for steering assist is a brushless motor, a rotation angle has to be detected to drive the motor 4, and a resolver for rotation angle detection that is installed at the motor 4 can be also used as the motor angle detector 6.

The shaft angle detector 5 and motor angle detector 6 output signals that show a plurality of, for example n, periodic fluctuations during one rotation of the steering shaft 2 and the rotation shaft of the motor 4 that are the detection object. Because the steering shaft 2 makes 4 to 5 rotations within the entire steering angle range between the left and right steering limit positions, the detection value of the shaft angle detector 5 shows 4×n to 5×n periodic fluctuations within the entire steering angle range. Because the motor 4 for steering assist performs the number of revolutions, for example N revolutions, corresponding to the reduction ratio of the ball screw mechanism provided for transmission to the rack shaft 11 within the entire steering angle range between the left and right steering limit positions, the detection value of the motor angle detector 6 shows N×n periodic fluctuations within the entire steering angle range.

The shaft angle detector 5 and motor angle detector 6 are selected such that the respective fluctuation periods thereof do not overlap and that a combination of respective detection values of only one sort is present in the entire steering angle range. That is, the detection value of the shaft angle detector 5 and the detection value of the motor angle detector 6 are selected such that, within the entire steering angle range, one of combinations of the respective detection values is different from all of the other combinations of the respective detection values. Such a selection can be realized based on a combination of the number of revolutions of the steering shaft 2 within the entire steering angle range, the number n of output fluctuations of the shaft angle detector 5 and motor angle detector 6 per one rotation, and the reduction ratio 1/N of the ball screw mechanism.

The detection values of the above-described shaft angle detector 5 and motor angle detector 6 are inputted in a steering angle calculation unit 7. The detection value of an ambient temperature of the steering mechanism 1 is also inputted into the steering angle calculation unit 7 from the temperature sensor 8 disposed in the vicinity of the steering mechanism 1. The steering angle calculation unit 7 calculates a steering angle over the entire steering angle range by using the detection values of the shaft angle detector 5 and motor angle detector 6 and also the detection value of the temperature sensor 8.

Figure 2:
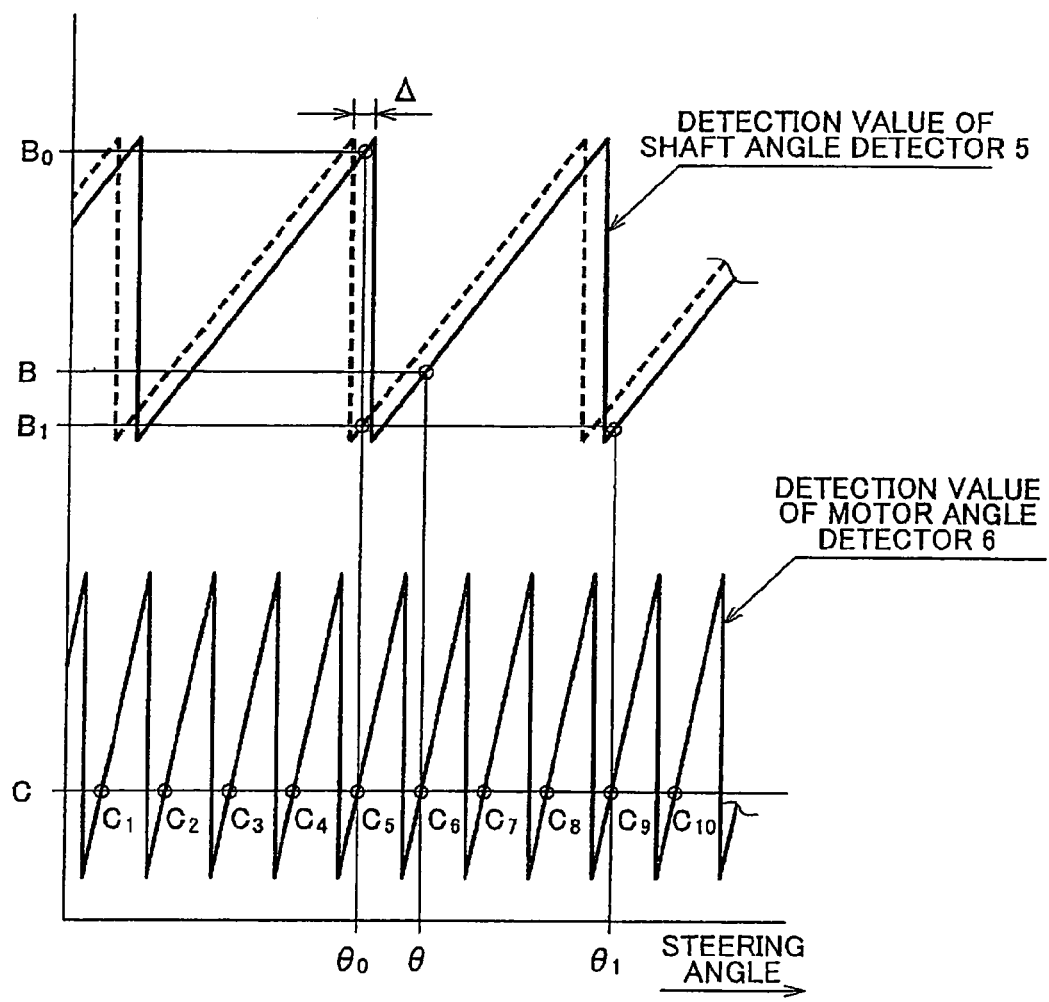
FIG. 2 is an explanatory drawing of a steering angle calculation procedure performed by the steering angle calculation unit.

FIG. 2 is an explanatory drawing showing a steering angle calculation procedure implemented by the steering angle calculation unit 7. Variations of the detection value of the shaft angle detector 5 that follow the variations in steering angle are shown at the upper side of FIG. 2, and variations of the detection value of the motor angle detector 6 are shown at the lower side of FIG. 2.

For example, in a case where the detection value of the motor angle detector 6 is such as shown by C in FIG. 2, the present steering angle is any of the angles corresponding to the intersection points $C_1$ to $C_{10}$ in each period, but where the detection value of the shaft angle detector 5 that is provided at the same time is such as shown by B in FIG. 2, the steering angle can be found as angle θ corresponding to $C_6$ from among the intersection points $C_1$ to $C_{10}$.

The steering angle calculation unit 7 is an arithmetic processing unit including a central processing unit (CPU), a read only memory (ROM), and a random access memory (RAM) and stores output characteristics of the shaft angle detector 5 and motor angle detector 6, such as shown in FIG. 2. In a case where a detection value B of the shaft angle detector 5 and a detection value C of the motor angle detector 6 are inputted in the steering angle calculation unit 7, the steering angle θ is calculated by the procedure shown in FIG. 2. As mentioned hereinabove, the shaft angle detector 5 and motor angle detector 6 are selected such that the fluctuation periods of respective detection values do not overlap and identical detection value combinations do not occur in the entire steering angle range. Therefore, the calculation of the steering angle θ by the procedure shown in FIG. 2 in the steering angle calculation unit 7 can be implemented over the entire steering angle range.

The above-described calculation of steering angle is implemented only in a case where the initial steering angle, as a present steering angle immediately after the key switch has been turned on, is unclear, for example in a case where the key switch is switched on and the vehicle movement is started. Subsequent steering angle calculations with the steering angle calculation unit 7 are thereafter performed by taking the calculated initial steering angle as a starting point and successively integrating the detection value of the shaft angle detector 5 and motor angle detector 6 that are sequentially provided.

However, in the rack-and-pinion steering mechanism 1, the rack housing 10 that supports the rack shaft 11 is made from aluminum to reduce weight, and in a case where the ambient temperature of the steering mechanism 1 is high, the elongation of the rack housing 10 made from aluminum differs from the elongation of the steel rack shaft 11. As a result, the rack shaft 11 performs relative movement in the axial direction inside the rack housing 10, the pinion shaft 13 is rotated because of this movement, and the rotation angle of the steering shaft 2 coupled to the pinion shaft 13 changes.

In this case, the detection value of the shaft angle detector 5 that detects the rotation angle of the steering shaft 2 does not correspond to the actual steering angle determined by the movement position of the rack shaft 11. As a result, instead of the inherent characteristic represented by a solid line in FIG. 2, a characteristic is obtained that is represented by a broken line shifted by a variation fraction $\Delta$ of the rotation angle of the steering shaft 2.

Therefore, in a case where the actual steering angle is 60 shown in FIG. 2, the detection value of the motor angle detector 6 is C, whereas the detection value of the shaft angle detector 5 is $B_1$ on the characteristic represented by the broken line, rather than $B_0$ of the characteristic represented by the solid line, and the steering angle calculation unit 7 calculates an initial steering angle that is completely different from the correct value $\theta_0$ based on the combination of C and $B_1$.

In this case, an angle $\theta_1$ corresponding to a point on the characteristic represented by the solid line in which the detection value of the shaft angle detector 5 is close to $B_1$, that is, a point $C_9$ from among the intersection points $C_1$ to $C_{10}$, is calculated as the initial steering angle, and subsequently calculated values of steering angle that are obtained by taking this initial steering angle $\theta_1$ as the starting point also include an error. As shown in FIG. 2, the error of the detection value of the shaft angle detector 5 increases when the detection value $B_0$ of the shaft angle detector 5 is close to a peak value of fluctuation period of the normal characteristic represented by the solid line and the probability of obtaining a steering angle that is completely different from the actual steering angle increases.

In accordance with the embodiment of the invention of the application, a detection value of the temperature sensor 8 is used to eliminate the detection error of the shaft angle detector 5 that is generated in the above-described manner by the effect of ambient temperature of the steering mechanism 1. The detection error of the shaft angle detector 5 is generated by the difference between a temperature during medium point leaning of a steering angle that is implemented in the vehicle production process and a temperature at a time the present number of turns, that is, the initial steering angle, is determined after the key switch has been switched on. In other words, the detection error of the shaft angle detector 5 is generated by the difference between a temperature during mid-point learning of a steering angle that is implemented in the vehicle production process and a temperature at a time the detection angles of the shaft angle detector 5 and motor angle detector 6 are stored, those detection angles being detected immediately after the key switch has been switched on and in a straightforward movement state of the front wheel 14, 14. The relationship between the relative movement amount of the rack shaft 11 that causes this detector error, the variation amount of the rotation angle of the pinion shaft 13 and steering shaft 2 that results from this movement, and the ambient temperature of the steering mechanism 1 can be found in advance based on specifications of components of the steering mechanism 1, such as dimensions of the rack housing 10 and rack shaft 11 and the meshing position of the rack shaft 11 and pinion shaft 13, and also on the ambient temperature at the time of mid-point leaning. Therefore, the correspondence relationship between the shift amount $\Delta$ of the characteristic of the shaft angle detector 5 and the ambient temperature surrounding the steering mechanism 1 can be also found in advance.

In accordance with the embodiment of the invention of the application, the map representing the correspondence relationship found in the above-described manner is stored in a ROM of the steering angle calculation unit 7. When the calculation of the initial steering angle is implemented by the steering angle calculation unit 7 in the above-described manner, the steering angle calculation unit receives the ambient temperature of the steering mechanism 1 that is provided from the temperature sensor 8 and finds the shift amount $\Delta$ by applying the temperature detection value and the ambient temperature at the time of mid-point learning to the map. Then, the steering angle calculation unit determines a detection value of the shaft angle detector 5 on the characteristic line corrected by the shift amount $\Delta$ and calculates the initial steering angle based on the combination with the detection value of the motor angle detector 6, as described hereinabove.

Thus, the steering angle calculation unit 7 corrects the detection value of the shaft angle detector 5 on the basis of detection results of ambient temperature of the steering mechanism 1 that are obtained with the temperature sensor 8 and calculates the initial steering angle on the basis of combination of the corrected detection value of the shaft angle detector 5 and the detection value of the motor angle detector 6. Therefore, the calculation error caused by the ambient temperature of the steering mechanism 1 is eliminated and a correct initial steering angle can be calculated. As a result, the detection accuracy of steering angle detection values that are thereafter obtained by taking this initial steering angle as a starting point is also good.

In the explanation above, the detection value of the shaft angle detector 5 is corrected correspondingly to the ambient temperature of the steering mechanism 1, but the detection value of the motor angle detector 6 may be also corrected. Further, where the detection value of shaft angle obtained with the shaft angle detector 5 is corrected, because variations in the absolute steering angle that is obtained thereafter are sometimes undesirable, it is preferred that the correction of the detection value of the shaft angle detector 5 be implemented only when the above-described number of turns is determined.

In a case where a resolver is used as the motor angle detector 6 or shaft angle detector 5, the ambient temperature of the motor angle detector 6 or shaft angle detector 5, that is the ambient temperature of the steering mechanism 1, can be found using the output signals of the resolver. Conventionally a resolver is configured to output a cosine wave signal and a sine wave signal in response to the rotation of a shaft of the motor 4 for steering assist that is an object shaft and to find the rotation angle by using these signals. A value of the sum of squares of amplitudes of the cosine wave signal and sine wave signal is a constant value, regardless of the rotation angle, but because this value has a property of varying in response to the effect of ambient temperature, the ambient temperature of the steering mechanism 1 can be calculated based on this sum of squares. In this case, the temperature sensor 8 is not required.

For example, a sum of squares of amplitudes of the cosine wave signal and sine wave signal of a resolver that is used as the motor angle detector 6 is detected under various temperature conditions, and a map representing the correspondence relationship of the value of sum of squares and the temperature is created and stored in the ROM of the steering angle calculation unit 7. The steering angle calculation unit 7 finds the sum of squares of amplitudes from the detection value of the motor angle detector 6, applies this result to the map, and calculates the ambient temperature. The ambient temperature thus found is used, as described hereinabove, to correct the detection value of the shaft angle detector 5 or detection value of the motor angle detector 6.

A steering angle of the front wheels 14, 14 that is calculated in the above-described manner in the steering angle calculation unit 7 is inputted together with the detection value of steering torque detected by the torque sensor 3 into an assist control unit 9. The assist control unit 9 is provided with a CPU, a ROM, and a RAM and configured as an electronic control unit (ECU) that executes the assist control by CPU operating according to a control program stored in the ROM. The assist control operation of the assist control unit 9 is a conventional control operation of finding a target assist force by using a steering torque detection value obtained with the torque sensor 3, performing increase-decrease control of a drive current of the motor 4 for steering assist that has to generate the target assist force, and assisting the steering that is performed in the above-described manner.

The steering angle value provided from the steering angle calculation unit 7 to the assist control unit 9 is used to correct the target assist force that is determined based on the steering torque. This correction is performed, for example, by decreasing the target assist force when the steering angle is small and increasing the target steering force when the steering angle is large. As a result, during straightforward movement of the vehicle, the straightforward movement stability can be increased by reducing the steering assist force that is generated by the motor 4 and imparting rigidity to the steering wheel 20. During large steering at which the operation amount of the steering wheel 20 is high, the steering assist force generated by the motor 4 can be increased and light steering feel can be created.

The calculation of steering angle in the steering angle calculation unit 7 can be executed immediately after the vehicle started moving from a stopping state, and the calculated steering angle is a correct steering angle from which the error induced by the effect of ambient temperature has been eliminated. Therefore, the above-described correction by the assist control unit 7 can be rapidly executed.

The steering angle calculated in the steering angle calculation unit 7 can be provided not only to the above-described assist control unit 9, but also to other control units installed at a vehicle, such as an anti lock braking system (ABS) control unit and a torsion control unit, and can be used for control in the respective control unit. In this case, the correct steering angle can be also determined immediately after the vehicle started moving and, therefore, this steering angle can be effectively used for respective control.

What is claimed is:

1. A steering angle detection device comprising:
a shaft angle detector that detects a rotation angle of a shaft that transmits a rotation operation of a steering member to a steering mechanism;
a motor angle detector that detects a rotation angle of a motor that applies a steering assist force to the steering mechanism;
a steering angle calculation unit that calculates a steering angle on the basis of a combination of the rotation angle detected by the motor angle detector and the rotation angle detected by the shaft angle detector; and
a temperature detector that detects an ambient temperature of the steering mechanism, wherein
the steering angle calculation unit corrects the rotation angle detected by the motor angle detector or the shaft angle detector, on the basis of the ambient temperature detected by the temperature detector, and uses the corrected rotation angle to calculate the steering angle.

2. The steering angle detection device according to claim 1, wherein
the motor angle detector or the shaft angle detector is a resolver that outputs a cosine wave signal and a sine wave signal that vary periodically in response to the rotation of the motor or the shaft, and
the temperature detector detects the ambient temperature on the basis of a sum of squares of amplitudes of the cosine wave signal and sine wave signal.

3. The steering angle detection device according to claim 1, wherein
the steering angle calculation unit calculates a shift amount of characteristics of the motor angle detector or the shaft angle detector, induced by a difference between the ambient temperature during mid-point learning of the steering angle implemented in a vehicle production process and the ambient temperature when an initial steering angle of the steering mechanism is determined, and corrects the rotation angle detected by the motor angle detector or the shaft angle detector based on the shift amount of characteristics.

4. The steering angle detection device according to claim 1, wherein
the shaft angle detector outputs a signal showing a plurality of periodic fluctuations during one rotation of the shaft that transmits the rotation operation of the steering member to the steering mechanism,
the motor angle detector outputs a signal showing a plurality of periodic fluctuations during one rotation of a rotary shaft of the motor, and
an output signal of the shaft angle detector and an output signal of the motor angle detector are selected such that, within the entire steering angle range, one of combinations of the respective output signals is different from all of the other combinations of the respective output signals.

5. A steering angle detection method comprising:
detecting a rotation angle of a shaft that transmits a rotation operation of a steering member to a steering mechanism;
detecting a rotation angle of a motor that applies a steering assist force to the steering mechanism;
detecting an ambient temperature of the steering mechanism, and
when a steering angle is calculated based on a combination of the detected rotation angle of the shaft and the detected rotation angle of the motor, correcting the detected rotation angle of the shaft or the detected rotation angle of the motor on the basis of the detected ambient temperature and using the corrected rotation angle to calculate the steering angle.

* * * * *